CABINET FOR ELECTRONIC EQUIPMENT

Filed Dec. 5, 1962 2 Sheets-Sheet 1

IRA MICHAEL RILES
INVENTOR.

BY Lyon & Lyon
ATTORNEYS

April 13, 1965 I. M. RILES 3,178,246

CABINET FOR ELECTRONIC EQUIPMENT

Filed Dec. 5, 1962 2 Sheets-Sheet 2

IRA MITCHAEL RILES
INVENTOR.

BY Lyon & Lyon
ATTORNEYS

United States Patent Office 3,178,246
Patented Apr. 13, 1965

3,178,246
CABINET FOR ELECTRONIC EQUIPMENT

Ira Michael Riles, Los Altos, Calif., assignor, by mesne assignments, to Systems Enclosures, Inc., a corporation of California Filed Dec. 5, 1962, Ser. No. 242,524
9 Claims. (Cl. 312—257)

This invention relates to cabinets for electronic equipment, and included among the objects of this invention are:

First, to provide a cabinet which is particularly adapted to contain and protect heavy equipment, which in turn contains small and delicate subcomponents such as, but not limited to, electronic equipment in the nature of radio, television, radar sending and receiving units, amplifiers, power supplies, and the like.

Second, to provide a cabinet of this type which incorporates novelly arranged structural or frame members formed of extruded metal, which not only are particularly rugged to withstand heavy loads and impacts, but also may be readily and quickly assembled or disassembled with the assurance that the component elements will fit properly.

Third, to provide a cabinet of this type wherein the various extruded structural elements may be cut to various standard lengths so that cabinets of various styles and capacities may be readily fabricated.

Fourth, to provide a cabinet of this type wherein certain of its structural elements form conduits for the conductor cables connecting various electronic components contained in the cabinet.

With the above and other objects in view, as may appear hereinafter, reference is directed to the accompanying drawings in which.

Figure 1:
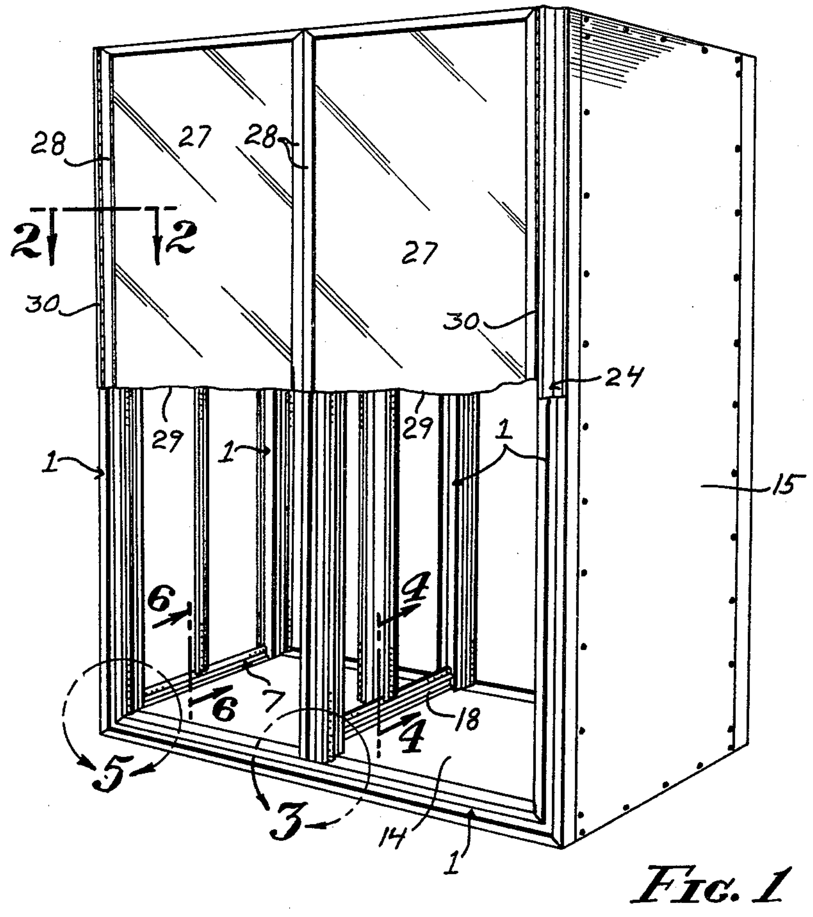
FIGURE 1 is a perspective view showing the cabinet for electronic equipment, with front doors and door frames shown fragmentarily.
Figure 2:
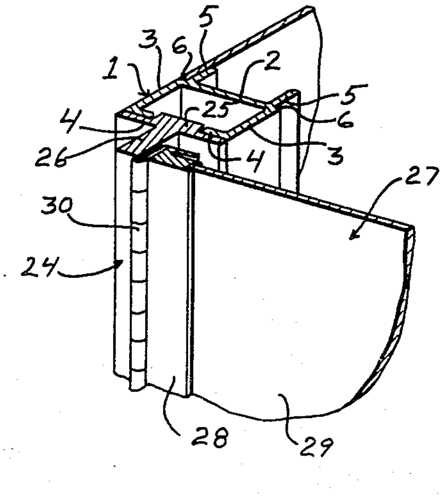
FIGURE 2 is an enlarged, fragmentary, sectional view taken through 2—2 of FIGURE 1.

The cabinet includes sets of channel frame members 1. Each channel frame member is preferably an extrusion, and thus is uniform in cross section throughout its length.

Each channel member 1 includes a cross web 2 and parallel side flanges 3 having inturned extremities 4. Each member also includes a pair of parallel ribs 5 extending from the cross web 2 in opposite directions to the side flanges 3, and offset inwardly with respect to the outer surfaces thereof to form shoulders 6.

A set of four channel frame members 1 is formed into a rectangular frame structure, the ends of the members being beveled at 45°. Two such frame structures are provided, one forming the forward side and the other the rearward side of the cabinet. The frame structures are spaced from each other by corner struts 7, which are also extrusions.

Figures 3, 4, 5, 6:
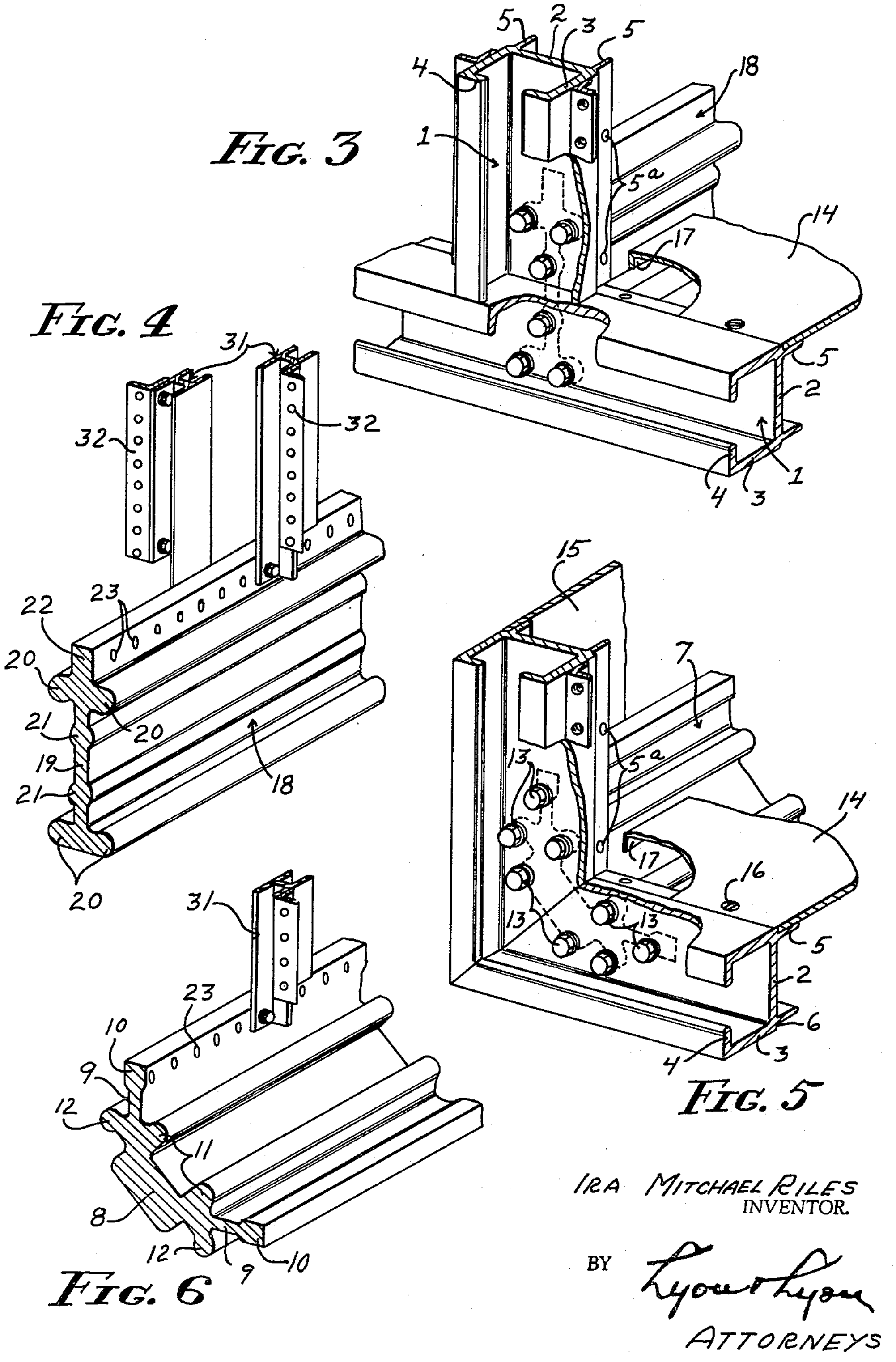
FIGURE 3 is an enlarged, fragmentary, sectional view with portions broken away, taken substantially within circle 3 of FIGURE 1.
FIGURE 4 is an enlarged, fragmentary, sectional view taken substantially through 4—4 of FIGURE 1.
FIGURE 5 is an enlarged, fragmentary, sectional view with portions broken away, taken substantially through circle 5 of FIGURE 1.
FIGURE 6 is a sectional view taken substantially through 6—6 of FIGURE 1.

As shown best in FIGURES 5 and 6, each corner strut 7 includes a 45° web 8 and flanges 9 disposed at 90° to each other, that is, at 45° to the web 8. The frames 9 are provided with transversely thickened extremities 10, and are also provided adjacent the web 8 with lateral internal ribs 11 and lateral external ribs 12. The thickness of the extremities 10 as well as the ribs 11 and 12 and the web 8 are such that they may be drilled and tapped in an axial direction.

The axial ends of the corner struts 7 fit between the ribs 5 of the channel frame members 1 and abut the cross webs 2 of the two right-angularly disposed members, as shown by dotted lines in FIGURE 5. Bolts 13 extend through the adjacent ends of the cross webs 2 and into the screw-threaded sockets provided in the corner struts 7. The corner struts thus form the means whereby the members of each frame structure are held together, as well as the means whereby the two frame structures are spaced from each other.

When the frame structures are assembled and connected by the corner struts 7, the ribs 5 form both internal and external surfaces for supporting the margins of panels. Appropriate internal ribs may be utilized to support a floor panel 14, as indicated in FIGURES 3 and 5, and appropriate outer ribs 5 may be utilized to support side panels 15, as well as a top panel, not shown. The panels are formed of sheet metal and are provided with marginal openings to receive screws 16, which are also received in a series of screw-threaded openings 5*a* provided in the ribs 5. Those margins of the panels which are not supported by the ribs 5 may be provided with side flanges 17, as suggested in FIGURES 3 and 5.

If the cabinet is intended as a single bay structure, the corner struts 7 are the only struts required. However, it is desirable in many cases to provide cabinets having two or more bays or compartments. For this purpose additional frame members 1 extend vertically between the side members of each frame structure and are joined to the lower and upper members of each frame structure by divider struts 18.

The divider struts 18 are also extrusions, and each includes a vertical central web 19 having upper and lower major lateral ribs 20 and minor ribs or laterally enlarged portions 21 between the ribs 20. The webs 19 extend above the upper set of major lateral ribs 20 to form a transversely thickened extremity 22, which is provided with a series of screw-threaded holes 23.

The divider struts 18 are so positioned that portions of their ends confront the webs 19 of the lower and upper members of the forward and rearward frame structures, and their remaining end portions confront the extremities of the intermediate frame members, as shown by dotted lines in FIGURE 3.

The forward and rearward frame structures define a continuous channel which faces forwardly or rearwardly, as the case may be. The channel of each frame structure receives a cover member 24 so that these channels may form conduits for electrical connections between electronic units which may be supported in the cabinet structure.

The cover members 24, for at least the forward frame structure, may be extrusions which are T-shaped in cross section to form a cross portion 25 adapted to be secured to one or both of the inturned extremities 4 of the channel frame members 1 and to a web 26 extending outwardly therefrom. The cross portion 25 may be thickened in its central region so as to extend between the inturned extremities 4 of the side flanges 3 and facilitate centering of the cover member 24 over its corresponding frame member 1.

The webs 26 define a rectangular opening in which may be fitted one or more doors 27. The doors may be conventional and comprise a marginal frame 28 in which is fitted a panel 29. One side of the door is provided with a hinge 30, preferably a continuous hinge. In the structure shown, two such doors are illustrated. A single door or additional doors may be provided, depending upon the number of bays or compartments into which the cabinet structure is divided.

In order to support electronic equipment, which is usually encased in drawer-like containers, the series of screw-threaded holes 23 in the webs 19 of the divider struts 18, as well as similar screw-threaded holes, also designated 23, in the extremities of the flanges 9 of the corner struts 7, are used to mount a plurality of support members 31 which may be in the form of extrusions of H-shaped cross section. The extremities of these members are joined to appropriate divider and corner struts 18 and 7, and in turn have angle members 32 attached thereto or formed integrally therewith. The angle members 32 have a series of holes which extend vertically, and to which the containers of the electronic units may be fastened.

It will be observed that by reason of the channel frame members 1 and the corner struts 7 as well as the divider struts 18, and the manner in which the struts are fastened to the frame members 1, a particularly rigid and load-resisting cabinet is formed. Not only is the cabinet capable of carrying electronic equipment having substantial weight but it also protects the equipment, as the cabinet is able to withstand heavy external loads.

The unique way in which the members of each frame structure are joined together by the struts 7 and 18 not only facilitates initial fabrication of the cabinet, but also permits ready disassembling and reassembling, should this be necessary for transportation or storage.

By reason of the fact that the major components of the cabinet frame are extrusions, a minimum amount of labor is required to form these extrusions into the various members which comprise the cabinet.

In addition to the framework of the cabinet and the rigid manner in which they are joined, the panel members and the manner in which these panel members are fastened still further increase the overall strength of the cabinet.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A cabinet structure, comprising:

(*a*) forward and rearward sets of frame members defining forwardly and rearwardly disposed rectangular frame structures, each frame member including a cross web and parallel flanges forming outwardly facing channels in the margins of said frame structures, each frame member also including ribs extending in the opposite direction from their respective flanges and relatively offset, whereby said forward and rearward frame structures may receive panels disposed therebetween;

(*b*) and panels joining said frame structures and secured to said ribs, their outer surfaces being substantially flush with corresponding flanges of said frame members.

2. A cabinet structure as set forth in claim 1, wherein:

(*a*) struts of uniform cross section extend between the webs of the forward and rearward frame structures within said panel members and present end surfaces confronting said webs dimensioned to receive bolts extending through said webs and screw-threaded longitudinally into said struts.

3. A cabinet structure as set forth in claim 2, wherein:

(*a*) certain margins of said struts are provided with a series of screw-threaded perforations;

(*b*) and equipment-supporting members, also having a series of screw-threaded perforations, extend between pairs of said struts.

4. A cabinet structure as set forth in claim 1, wherein:

(*a*) corner struts of uniform cross section having flanges at 90° relation to each other and webs at 45° relation to said flanges, said webs and flanges being laterally enlarged to permit drilling and tapping, the ends of said corner struts confronting said webs to receive bolts extending through said webs.

5. A cabinet structure as set forth in claim 1, wherein:

(*a*) cover members fit over said channels to convert said channels into continuous closed passages.

6. A cabinet structure as set forth in claim 5, wherein:

(*a*) said cover members, for the channels of at least one of said frame structures, are T-shaped in cross section to form an outwardly projecting door frame;

(*b*) and a door is set within said door frame.

7. A cabinet structure, comprising:

(*a*) forward and rearward sets of frame members of uniform cross section defining forwardly and rearwardly disposed rectangular frame structures, each frame member including a cross web and parallel flanges forming outwardly open channels in the margins of said frame structures;

(*b*) struts of uniform cross section and having laterally enlarged ribs extending the lengths thereof dimensioned to be drilled and tapped, said struts extending between said frame structures with their ends confronting said webs;

(*c*) and bolts disposed within said channels for securing said frame structures and struts together.

8. A cabinet structure as set forth in claim 7, wherein:

(*a*) cover members fit over said channels to convert said channels into continuous closed passages.

9. A cabinet structure as set forth in claim 7, wherein:

(*a*) each of said frame members includes parallel ribs extending from said webs in the opposite direction from said flanges and having rows of screw-threaded perforations to form panel-mounting means internally and externally of said frame structures;

(*b*) and panels secured to selected ribs internally and externally of said frame structures.

References Cited in the file of this patent

UNITED STATES PATENTS

| | | |
|---|---|---|
| 2,046,095 | Shaw | June 30, 1936 |
| 2,948,362 | Jones | Aug. 9, 1960 |
| 3,017,037 | McDowell | Jan. 16, 1962 |
| 3,075,818 | Fay | Jan. 29, 1963 |

FRANK B. SHERRY, *Primary Examiner.*